United States Patent [19]

Lane

[11] 4,449,881
[45] May 22, 1984

[54] REMOVABLE TIRE CARRIER

[76] Inventor: Joseph E. Lane, 1204 Dorchester Ave., Baltimore, Md. 21207

[21] Appl. No.: 340,816

[22] Filed: Jan. 19, 1982

[51] Int. Cl.³ .............................................. B62D 43/04
[52] U.S. Cl. .................................... 414/428; 414/463; 414/467; 414/500
[58] Field of Search ............... 414/426, 427, 428, 429, 414/430, 462, 463, 464, 465, 466, 467, 498, 500; 296/37.2; 224/42.21, 42.23, 42.25, 42.41

[56] References Cited

U.S. PATENT DOCUMENTS

| | | | |
|---|---|---|---|
| 1,054,171 | 2/1913 | Buermann | 224/42.25 X |
| 1,761,916 | 6/1930 | Hebner | 224/42.23 X |
| 2,723,066 | 11/1955 | Sherman | 224/42.21 |
| 2,877,912 | 3/1959 | Giacomo | 414/428 |
| 3,229,838 | 1/1966 | Johnson | 414/462 |
| 3,554,397 | 1/1971 | Cluff | 414/463 |
| 3,790,012 | 2/1974 | Hrivnyak | 414/466 |

OTHER PUBLICATIONS

IBM Technical Disclosure Bulletin, vol. 22, No. 6, Nov. 1979, "Lift and Carry Device".

Primary Examiner—Leslie J. Paperner
Attorney, Agent, or Firm—Howard W. Califano

[57] ABSTRACT

An apparatus is disclosed for transporting and storing a spare tire. The spare tire is mounted on a hand dolly which is winched into a secure position beneath the vehicle frame. When the hand dolly carrying the spare tire is lowered and released, it provides a means for transporting the spare tire to and from the vehicle.

2 Claims, 7 Drawing Figures

REMOVABLE TIRE CARRIER

BACKGROUND OF THE INVENTION

1. Field of the Invention

The invention relates to an apparatus for storing and transporting a spare tire. More particularly, the invention relates to a spare tire carrier which is removable from the vehicle and doubles as a hand dolly for transporting the tire to and from the vehicle.

2. Description of the Prior Art

Currently spare tires for trucks and multiple wheeled vehicles are stored in a tire carrier rack placed under the vehicle. To retrieve the spare tire from the rack the tire must be pulled from the rack and slid or rolled along the ground. Storing the spare tire in the rack, similarly, requires sliding or rolling the spare tire under the truck and lifting it into the rack. Considering the weight and size of tires used on multiple wheeled vehicles, the operation described above is physically difficult and generally requires that the operator obtain assistance.

Several patents have issued which unsuccessfully address this problem. U.S. Pat. No. 2,489,561 issued to Kenneth C. Clark, on Nov. 26, 1946, describes an apparatus in which a tire is mounted on a swingable arm which is in turn mounted on the frame of the vehicle. The swingable arm allows the tire to be stored under the vehicle and allows the arm to pivot and place the tire in a vertical position near the axis for tire mounting operations. U.S. Pat. No. 3,554,397 issued to John Verl Cluff, on Nov. 29, 1968, describes an apparatus which is useful for flat bed vehicles. The spare tire is connected directly by a cable to two pullies and a winch. The winch is turned and the tire is pulled along the ground and lifted into a position under the vehicle frame.

SUMMARY OF THE INVENTION

The present inventor recognized the limitations in the prior art tire carriers and designed an apparatus in which the tire carrier is removable from the vehicle and doubles as a hand dolly for transporting the tire to and from the vehicle, or from the storage location under the vehicle to the vehicle axis for tire mounting operations. The invented apparatus generally consists of: a hand dolly, for transporting and supporting the spare tire; and, an engaging and lifting means, both of which attach to the frame under the vehicle.

In operation, the hand dolly provides a means for easily transporting the spare tire to and from the storage area under the vehicle. The spare tire is stored under the vehicle by the following simple operation: (1) the hand dolly, carrying the spare tire, is wheeled into position beneath the vehicle; (2) the handle of the hand dolly is inserted into the engaging means; (3) a hook from a lifting means is attached to the hand dolly bottom plate; and, (4) the lifting means is used to winch the hand dolly into a secure position beneath the vehicle.

A novel feature of the invention is the use of a tire carrier which supports the spare tire under the vehicle and which is removable from the vehicle with the spare tire.

A second novel feature is that the removable tire carrier doubles as a hand dolly for transporting the spare tire to and from the vehicle.

A third novel feature is the use of a lifting means and an engaging means for pulling the tire carrier means into a secure position beneath the vehicle frame.

A fourth novel feature is the use of a locking means to prevent pilferage of the spare tire while in its stored position beneath the vehicle frame.

BRIEF DESCRIPTION OF THE DRAWINGS

The present invention is illustrated in the accompanying drawings, wherein.

DETAILED DESCRIPTION OF PREFERRED EMBODIMENT

Figure 1:
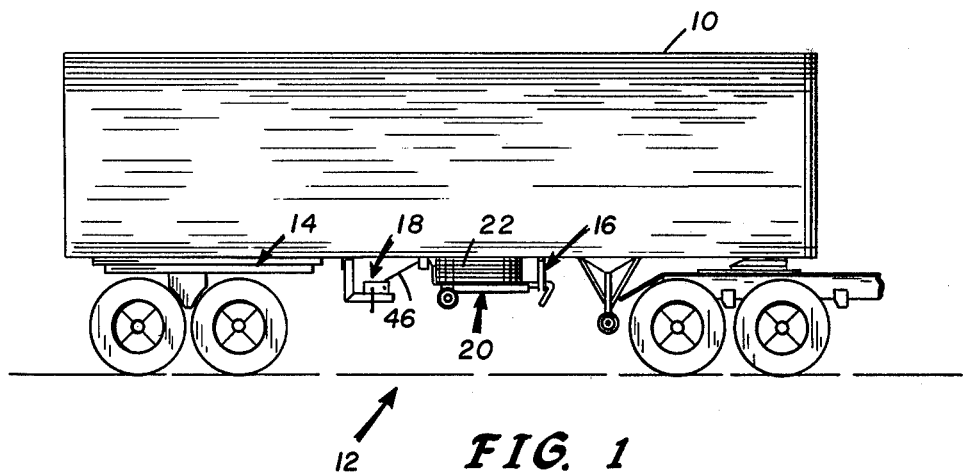
FIG. 1 is a side elevation view of a wheeled vehicle employing a presently preferred embodiment of the invented spare tire carrier.

FIG. 1 shows a wheeled vehicle 10 employing the invented spare tire carrier apparatus 12. FIG. 1 illustrates the general placement of the tire carrier apparatus 12 when it is lifted under the vehicle frame 14 and secures the spare tire for storage. When lowered from under the vehicle frame 14 (see FIG. 2), the tire carrier 20 doubles as a hand truck enabling the vehicle operator is conveniently transport the spare tire to and from the vehicle. FIG. 3 illustrates the use of the tire carrier 20 as a hand truck for transporting the spare tire.

Figure 2:
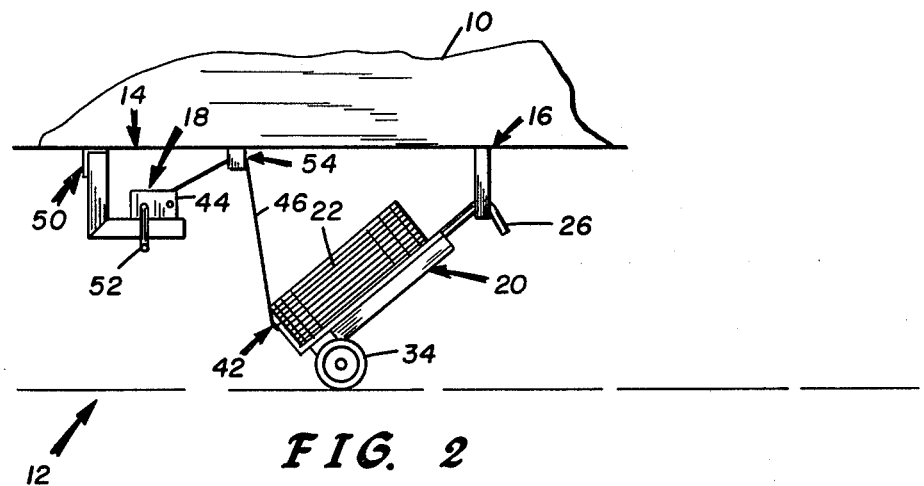
FIG. 2 is an expanded side elevation view of a wheeled vehicle employing the present invention and, illustrates the tire carrier being lowered.
Figure 3:
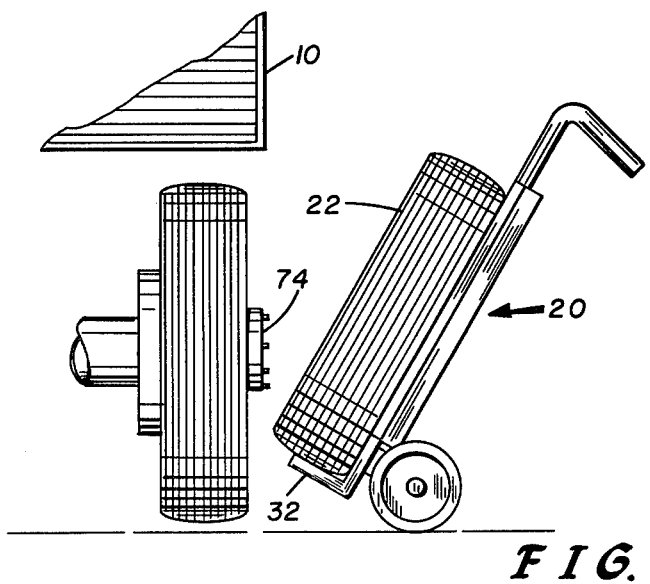
FIG. 3 shows the tire carrier separated from the wheeled vehicle and acting as a hand dolly for transporting the spare tire.

As illustrated in FIG. 2, the spare tire carrier apparatus 12 consists of: an engaging means 16 fixedly mounted on the underside of the vehicle frame 14, a lifting means 18 fixedly mounted on the underside of the vehicle frame 14 at a transverse distance from the engaging means 16 so that the spare tire carrier (or tire dolly) 20 and the spare tire 22 can be positioned between them. In the illustrated embodiment the engaging means 16 and the lifting means 18 are displaced longitudinally along the vehicle frame. However, any other orientation would be within the scope of this invention.

Figure 4:
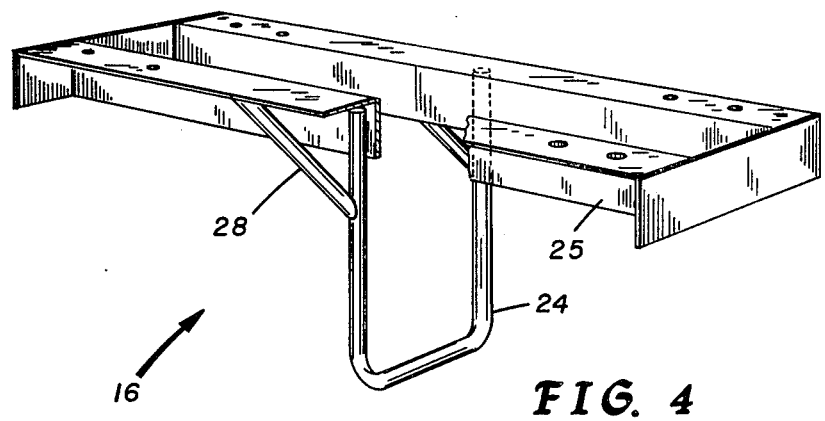
FIG. 4 is an enlarged fragmentary perspective showing the engaging means.

More particularly, as best shown in FIG. 4, the engaging means 16 consists of a U-shaped bracket 24, each side of which is welded or bolted to a rectangular frame 25. The U-shaped bracket 24 is optionally braced by support member 28. The rectangular frame 25 is made from metal angle brackets and is either bolted or welded to the vehicle chassis 14 (see FIG. 2). The U-shaped bracket 24 is sized to allow insertion of the dolly handle 26 (see FIG. 2). The verticle length of the U-shaped bracket 24 is such that when the tire dolly 26 is pivoted into its storage position (see FIG. 1) the spare tire 22 will be horizontally disposed and the face of the spare tire will fit evenly against the vehicle frame 14.

Figure 5:
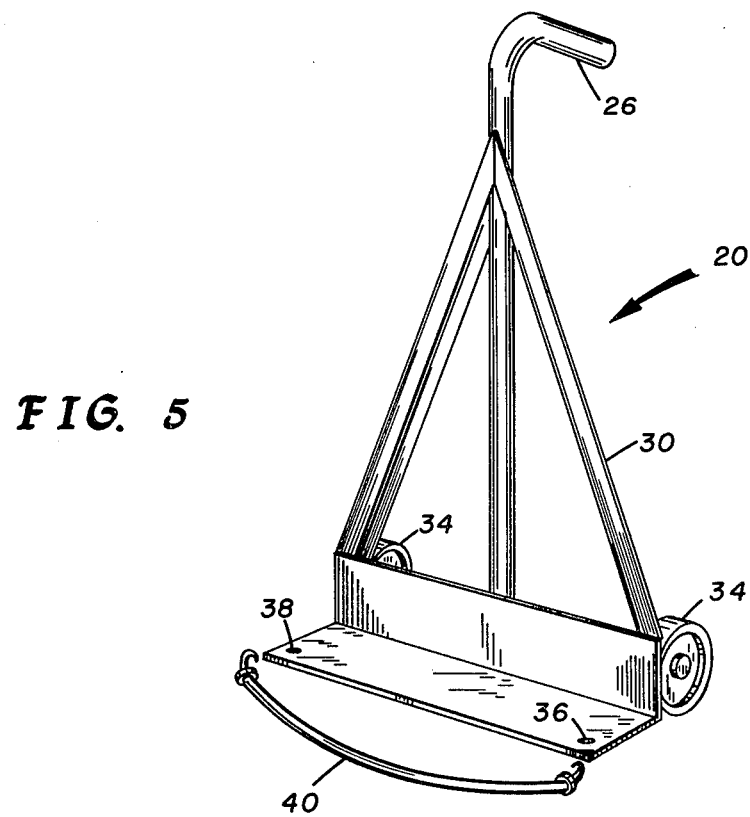
FIG. 5 is a perspective view of the tire carrier means.

As further best shown in FIG. 5, the tire carrier 20 is a hand dolly having a load supporting frame 30 of sufficient size to support the spare tire. The spare tire rests on the load supporting frame 30 with the edge of the tire resting on the bottom plate 32. Wheels 34 are mounted on the lower end of the support frame 30 and a handle 26 extends from the upper end. The dimension of the dolly from wheels 34 to handle 26 must be such that the handle 26 can be easily inserted into the U-shaped brace 16 (see FIG. 2) while the wheels 34 of the dolly rest on the ground. Two holes 36, 38 are drilled into either end of the bottom plate 32. A cable 40 with hooks attached to either end is strung between the holes 36, 38. The cable 40 is a connecting means which is connected via hook 42 to the winching means 18 (see FIG. 2). Other means for connecting the winch hook 42 to the bottom plate are readily apparent and are within the contemplation of the inventor.

Figure 6:
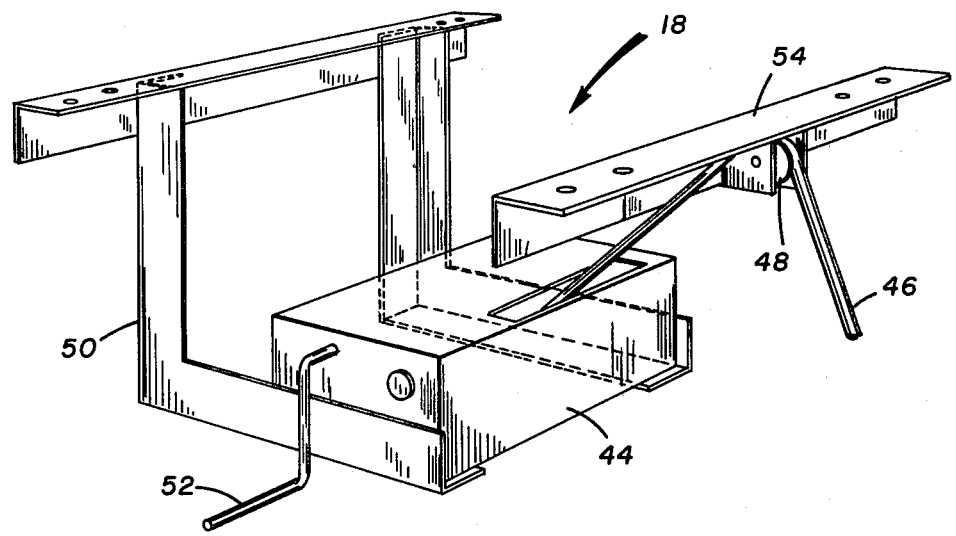
FIG. 6 is an enlarged fragmentary perspective showing the lifting means.

The lifting means 18, as more particularly shown in FIG. 6, contains a winch 44 and a pulley 48. The winch 44 is mounted on a hanger 50 made from metal brackets, which is either bolted or welded to the vehicle chassis 14 (see FIG. 2). The winch 44 is displaced a distance below the vehicle chassis 14 to allow the winch handle 52 clearance. A small pulley 48 is mounted on a pulley hanger 54 which is bolted or welded to the vehicle chassis 14 (see FIG. 2). A cable 46 runs from the winch 44, and through the pulley 48. The free end of the cable 40 contains a hook which engages with the dolly.

Figure 7:
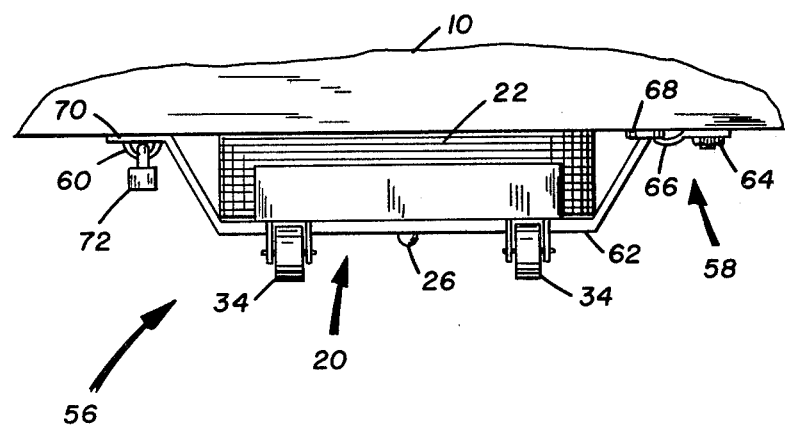
FIG. 7 is a front view of the tire locking means securing the tire to the vehicle frame.

As can be seen from FIG. 7, a locking means 56 holds the tire 22 and tire dolly 20 securely against the vehicle chassis 14 and prevents theft of the spare tire. The locking means 56 consists of a locking bar hanger 58, a U-bolt 60, and a locking bar 62. The locking bar hanger 58 has one portion 64 which is either bolted or welded to the vehicle chassis 14 and another portion 66 which engages a rolled steel section 68 of the locking bar 62. The U-bolt 60 is either welded or bolted to the vehicle chassis. One end of the locking bar 62 contains a slot 70 which allows the U-bolt 60 to be inserted therein. The other end of the locking bar 62 contains a rolled steel portion 68 which is welded to said locking bar 62. The locking bar hanger 58 and U-bolt 60 are disposed on either side of the spare tire 22 when in its stored position and the locking bar 62 is shaped to fit tightly around the spare tire 22 and hand dolly 20. In operation, after the spare tire is winched into its storage position the locking bar 62 is inserted into the locking bar hanger 58. The slotted end of the locking bar 70 is pushed up against the frame and the U-bolt 60 is inserted into said slot 70. A combination or padlock 72 is inserted through the U-bolt 60 and locks the locking bar 62 in position, thereby preventing theft of said spare tire.

In operation, the hand dolly 20 is wheeled under the vehicle and positioned so its bottom plate 32 faces the winch 44 and its handle 26 is inserted into the U-shaped bracket 16. Once the handle 26 has been inserted into the U-shaped bracket 16, the bent portion of the handle will allow only slight motion of the dolly 20 along the longitudinal axis toward the winch 44. The dolly 20 can move pivotally relative to the U-shaped bracket 16 in a verticle arc. The winch cable 40 is secured to the bottom plate 32 and the cable is winched, drawing the lower end of the dolly from the ground toward the pulley 48. The dolly (tire carrier means) 20 is lifted along the verticle arc until the spare tire 22 is pushed tightly against the vehicle frame 14. The spare tire 22 is now securely stored under the vehicle and the locking bar 62 can be attached for additional security. This process is reversed when it is desired to release the spare tire.

Once released from its position under said vehicle (see FIG. 3) the hand dolly 20 provides a convenient means to transport the spare tire 22.

The height of the base plate 32 above the ground is such that the spare tire 22 can be easily centered on the jacked tire rim 74. FIG. 3 shows the use of the tire dolly 20 when removed from the vehicle and how alignment of the tire is eased.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A spare tire carrier for wheeled vehicles to be positioned under the vehicle frame, comprising:
   a tire carrier means for transporting said spare tire when removed from said vehicle, and for supporting said spare tire securely against said vehicle frame when lifted into a position under said vehicle, consisting of:
   (a) a load supporting frame, consisting of a frame and a bottom plate, for supporting said spare tire, the side surface of said spare tire resting on the front face of said frame, the edge of said spare tire resting on said bottom plate;
   (b) a handle containing a tubular shaft having a straight portion and a portion bent away from the front face of said supporting frame fixedly connected to said straight portion, the upper end portion of said load supporting frame acting as a handle when said tire carrier means is removed from said wheel;
   (c) two wheels mounted on opposite sides of the lower portion of said load supporting frame, for wheeling said tire carrier means when removed from said vehicle; and,
   (d) a connecting means consisting of a cable having hooks affixed to each end, each of said hooks engaging holes spaced on opposite sides of said bottom plate;
   a means for engaging said handle of said tire carrier means, consisting of a U-shaped bar fixedly mounted under said vehicle frame, said handle being insertable into said U-shaped bar such that said tire carrier means can pivot securely when being lifted to said vehicle frame, and such that said bent portion of said handle tends to keep said handle secured in said U-shaped bar when said tire carrier means is placed under said vehicle frame;
   a means for lifting said tire carrier means to a position under said vehicle, consisting of:
   (a) a winch, fixedly mounted under said vehicle frame;
   (b) a pully mounted under said vehicle frame in a substantially parallel relationship between said winch and said engaging means;
   (c) a cable running through said pulley, having one end attached to said winch and the other end attached to a hook, said hook engageable with said connecting means on said tire carrier means; and,
   a means for locking said spare tire consisting of:
   (a) a hanger, fixedly mounted under said vehicle frame in a first area adjacent to the outer circumference of said spare tire, when said spare tire is lifted under said vehicle;
   (b) a U-bolt, fixedly mounted under said vehicle frame, at a second area on said vehicle frame adjacent to said spare tire outer circumference, said second area being oppositely disposed along said spare tire circumference from said first area; and, (c) a locking bar which fits around said tire carrier means and said spare tire, when said tire carrier means is lifted under said vehicle, having one end to engage said hanger and the other end to engage said U-bolt.

2. The apparatus of claim 1 in which said tire carrier means, when removed from said vehicle, supports said spare tire in such a position that when said tire carrier means is held at a nearly upright position the center of said spare tire is at the same distance from the ground as the jacked axle of said vehicle.

* * * * *